(12) United States Patent
Fletcher et al.

(10) Patent No.: US 7,927,645 B2
(45) Date of Patent: Apr. 19, 2011

(54) ENHANCING CLARITY AND/OR STABILITY PROPERTIES OF PROTEIN-CONTAINING LIQUIDS AND GELS

(75) Inventors: Katrina Fletcher, Palmerston North (NZ); Ping Chen, Liwan Guanzhou (CN); Tim Carroll, Palmerston North (NZ)

(73) Assignee: New Zealand Dairy Board, Wellington (NZ)

( * ) Notice: Subject to any disclaimer, the term of this patent is extended or adjusted under 35 U.S.C. 154(b) by 539 days.

(21) Appl. No.: 10/555,324

(22) PCT Filed: Apr. 16, 2004

(86) PCT No.: PCT/NZ2004/000072
§ 371 (c)(1),
(2), (4) Date: Nov. 13, 2006

(87) PCT Pub. No.: WO2004/091309
PCT Pub. Date: Oct. 28, 2004

(65) Prior Publication Data
US 2007/0082118 A1    Apr. 12, 2007

(30) Foreign Application Priority Data
Apr. 17, 2003 (NZ) ......................... 525408

(51) Int. Cl.
*A23L 1/05* (2006.01)
(52) U.S. Cl. ........ 426/573; 426/656; 426/583; 426/590; 426/520

(58) Field of Classification Search .................. 426/237, 426/656, 519, 580, 531, 573, 583, 590, 520
See application file for complete search history.

(56) References Cited

U.S. PATENT DOCUMENTS

| 4,804,552 | A | * | 2/1989 | Ahmed et al. ................ 426/580 |
| 5,232,726 | A | | 8/1993 | Clark et al. |
| 5,328,703 | A | | 7/1994 | Nakagawa et al. |
| 6,423,354 | B1 | | 7/2002 | Monte |

FOREIGN PATENT DOCUMENTS

| EP | 0 117 011 A1 | 8/1984 |
| EP | 0 480 422 B1 | 4/1992 |
| EP | 0582887 A3 | 2/1994 |
| FR | 2 690 854 A1 | 11/1993 |
| FR | 2 789 267 A1 | 8/2000 |
| JP | 2001314177 | 11/2001 |

(Continued)

OTHER PUBLICATIONS

Milk Allergy, Kids Health, Aug. 5, 2002.*

(Continued)

*Primary Examiner* — Drew E Becker
*Assistant Examiner* — Preston Smith
(74) *Attorney, Agent, or Firm* — Knobbe Martens Olson & Bear LLP (57) ABSTRACT

The present invention describes a method of enhancing clarity and/or stability properties of a protein-containing liquid or gel, comprising subjecting said liquid or gel to a pressure treatment of 100 Mpa or greater. Preferred proteins useful in the invention are whey protein isolates and whey protein concentrates. The methods of the invention may be used to improve the clarity and/or stability properties of fruit juices, vegetable juices, protein concentrates and protein syrups.

24 Claims, 6 Drawing Sheets

FOREIGN PATENT DOCUMENTS

NL            0117011     *   2/1984

OTHER PUBLICATIONS

Iron Status of Anemic Rats Fed Iron-Fortified Cereal-Milk Diets, T.A. Anderson, vol. 14, No. 6, 1972.*

Calcium Citrate Shown to Have Superior Bioavailability and Protects Against Bone Loss, Medscape, J Clin Pharmacol, 2000.*

Strawberry Panna Cotta with Straweberries and Honey, Jun. 2000.*

A. Olano, Micellar Changes Induced by High Pressure, Nov. 24, 1999.*

Protein Content of Milk, Apr. 16, 2003.*

Milk Chemistry—An introduction, Feb. 17, 2007.*

Influenced of sugars on high pressure induced gelation of skim milk dispersionsNPL, 2001.*

Wei et al.; High Pressure Technology and Application on Dairy Product, China Dairy Industry; 1998;26(6): 23-27 with abstract in English.

López-Fandiño et al., "Distribution of minerals and proteins between the soluble and colloidal phases of pressurized milks from different species," *Journal of Dairy Research* 65, 69-78 (1998).

Galazka et al., "High Pressure Effects on Emulsifying Behavior of Whey Protein Concentrate," *Journal of Food Science,* vol. 60, No. 6, pp. 1341-1343 (1995).

Garcia-Risco et al., "Micellar Changes Induced by High Pressure. Influence in the Proteolytic Activity and organoleptic Properties of Milk," *J Dairy Sci* 83:2184-2189 (2000).

Horton, G., "The Whey Processing Industry—into the $21^{st}$ Century," *International Dairy Federation* Session 1 Date : Oct. 27-29, 1997.

Huffman, Lee M., "Processing Whey Protein for use as a Food Ingredient," *Food Technology,* pp. 49-52 (Feb. 1996).

Ludikhuyze et al. "Effect of temperature and/or pressure on lactoperoxidase activity in bovine milk and acid whey," *Journal of Dairy Research,* 68, 625-637 (2001).

Needs et al., "Comparison of heat and pressure treatments of skim milk, fortified with whey protein concentrate, for set yogurt preparation: effects on milk proteins and gel structure", *Journal of Dairy Research,* 67, 329-348, (2000).

Yen, G. and Lin, H., "Comparison of high pressure treatment and thermal pasteurization effects on the quality and shelf life of guava puree," *International Journal of Food Science and Technology,* 31, 205-213 (1996).

* cited by examiner

Proportion of two sources of whey protein isolate in 3.5% protein-enriched apple juices at pH 3.75

Figure 5

ENHANCING CLARITY AND/OR STABILITY PROPERTIES OF PROTEIN-CONTAINING LIQUIDS AND GELS

REFERENCE TO RELATED APPLICATIONS

The present application is the U.S. national phase of international application PCT/NZ2004/000072, filed Apr. 16, 2004 and claims priority to New Zealand Patent application number 525408, filed Apr. 17, 2003. Each of the priority applications is hereby incorporated by reference.

FIELD OF INVENTION

The present invention describes methods of enhancing clarity properties of protein-containing liquids and gels.

BACKGROUND

There has been an increased demand for "off the shelf" products which provide a consumer with instantly accessible nutrients. Examples of such products are energy bars and fortified sports drinks. Such products are often "loaded" with additional vitamins, minerals and proteins so as to provide the consumer with a "one stop" nutritional snack when needed, e.g. before or after participation in sporting activities.

At commercially desirable pH, some protein-containing liquids may have poor stability or solubility, and may precipitate, aggregate and sediment in the liquid. This may cause a deterioration of commercially-desirable characteristics of certain liquid products, such as mouthfeel, appearance or flavour. This may be manifested as either a loss in a desired clarity in which the liquid is rendered cloudy or opaque, or a loss in desired stability in which material precipitates or aggregates to an extent sufficient to form visible sediment. it is also known in the art that the heating of or the presence of multivalent metal cations or their compounds in protein-containing liquids may initiate or exacerbate the processes leading to loss of clarity or stability.

In particular, as regulations often require that certain beverages undergo a heat treatment, the inability to deliver or maintain the desired characteristics of the beverage may further require compromises in beverage composition. It would be desirable to improve the properties of such beverages or reduce the limitations on their composition.

It is an object of this invention to provide an improved or alternative method of enhancing clarity and/or stability properties of a liquid or gel, said liquid or gel containing an amount of protein.

SUMMARY OF INVENTION

In one aspect, the invention broadly describes a method of enhancing clarity and/or stability properties of a protein-containing liquid or gel, comprising subjecting said liquid or gel to a pressure treatment of at least 100 MPa.

Preferably the protein comprises whey protein. Particularly preferred proteins useful according to the invention are whey protein isolates and whey protein concentrates The protein in the liquid or gel may be hydrolysed, non hydrolysed protein, or a combination of hydrolysed and non-hydrolysed protein.

Preferably the pH of the liquid or gel is less than about 4.5. More preferably the pH is between 3.5 and 4.2.

Alternatively the pH may greater than about 6.0, preferably between 6.0 and 6.8.

The protein may be present in the liquid or gel at a concentration of less than about 40% w/w, and preferably less than about 28% w/w. Protein concentrations of less than about 10% w/w are also envisaged.

Preferably the liquid or gel is pressure treated at a pressure of at least about 400 MPa. More preferably the liquid or gel is pressure treated at a pressure of at least about 500 MPa, most preferably at 580 MPa, 700 MPa, 800 MPa or higher.

In one embodiment of the invention the protein-containing liquid or gel may further comprise an amount of a divalent or polyvalent metal cation or compound thereof. Such divalent or polyvalent metal cations may be selected from calcium, iron, or combinations thereof.

Sources of calcium may include calcium lactate, tricalcium phosphate, calcium citrate-malate, calcium lactate gluconate, or calcium citrate. Sources of iron may include ferrous sulphate heptahydrate or iron pyrophosphate.

The protein-containing liquid or gel may further comprise one or more of the following: carbohydrate, sugar alcohol, alcohol, or sweetening agent.

Preferred carbohydrates include sucrose and fructose. A preferred source of fructose is high fructose corn syrup. An alternative carbohydrate source is fermentable liquor.

The protein-containing liquid or gel may further comprise carbon dioxide. In a particularly preferred embodiment, the protein-containing treated liquid or gel is carbonated.

In one embodiment the pressure treatment takes place after a heat treatment. Alternatively the pressure treatment may take place before a heat treatment.

Preferred liquids or beverages treated in accordance with the invention may comprise an amount of fruit juice, vegetable juice, or combinations thereof.

The invention may also broadly be said to consist in any alternative combination of features as described or shown in the accompanying examples. Known equivalents of these features not expressly set out are nevertheless deemed to be included.

BRIEF DESCRIPTION OF THE DRAWINGS

In all five FIGS., clarity is measured as the absorbance of light at 610 nm. A high transmission of light (i.e. a low absorbance) indicates a high clarity.

DETAILED DESCRIPTION OF THE INVENTION

As mentioned herein, references to "high pressure treatment" refer to ultra high-pressure (UHP) treatments. Such treatments are generally accepted as pressure treatments using pressures of at least 100 MPa. This is also known in the art as "high hydrostatic pressure" (HHP) or "high pressure processing" (HPP).

A pressure treatment is understood to comprise the following placing a substrate into the chamber and sealing the chamber raising the pressure in the chamber, and thereby the substrate to a predetermined set pressure holding the substrate at this pressure for a predetermined time, termed the treatment time, dwell time or hold time, releasing the pressure from the chamber and removing the substrate.

The characteristics of the high-pressure equipment used might affect the conditions required to successfully perform the invention. In particular, the time taken to achieve the treatment pressure and to release the treatment pressure from the substrate, and the accuracy with which the treatment pressure is delivered and controlled will influence the outcomes, particularly in situations where it is not necessary for the substrate to be held at the treatment pressure for an appreciable time.

A "protein-containing liquid or gel" refers to a liquid or gel containing an amount of protein—whether the protein is naturally present in the liquid or gel or has been subsequently added to the liquid or gel.

As mentioned herein, references to "beverages" refer to consumable liquids and gels.

References are also made to "syrup" and "syrups". Such references refer to liquids or gels used in foods (e.g. confectionary) and beverages. These typically are derived from plant extracts from which the starch has been hydrolysed to sugar (e.g. high fructose corn syrup).

For the purposes of this invention "protein syrup" or "protein-containing syrup" is intended to describe not only such syrups to which a source of protein (e.g. a protein powder, concentrate or retentate) is added, but also liquids produced by the addition of sugar (e.g. in powder or granular form) to a liquid protein concentrate or such liquids produced by the mixing in water of such sugars and sources of proteins.

It is known in the art that microbes in foods and beverages may be inactivated by heat and that high pressure treatment is an alternative technology for microbial inactivation.

The applicants have discovered that high pressure treatments are useful in enhancing clarity properties of protein-containing liquids or gels.

Protein ingredients suitable for use in the present invention are whey proteins. Preferred whey proteins include whey protein isolates and whey protein concentrates. Such ingredients are commercially available.

Whey is a by-product of cheese or casein manufacture, and the protein products derived from whey may be classified on the basis of their protein content, including whey protein concentrates containing at least 30% protein, to whey protein isolates containing at least 90% protein [Huffman, 1996, IDF, 1998]. Membrane ultrafiltration (and diafiltration) is typically used in the manufacture of such products to concentrate (and purify) the whey protein to 25-35% solids before drying, and the protein concentrate derived from the membrane filtration step is known in the art as retentate. Whey protein is a collective term encompassing several individual proteins and in the present invention may include whey protein collectively or fractions thereof.

When selecting a source of protein for use according to present invention, a person skilled in the art would understand that the fat content in the source of protein might affect the working of the invention.

As mentioned herein, "enhancing clarity and/or stability properties" may refer to several possible outcomes following a pressure treatment:

The direct improvement of the clarity or stability of a protein-containing liquid or gel The pressure treatment of a liquid or gel (e.g. protein syrup or concentrate) which enables it to improve the clarity or stability of a subsequent liquid or gel into which it is added A reduction in the loss of clarity, stability or solubility that occurs upon heating of a protein-containing liquid by pressure treating the liquid before or after the heat treatment A reduction in the loss of clarity or stability of a final heat-treated or carbonated liquid or gel arising from the pressure treatment of an intermediate liquid or gel (e.g. protein syrup or concentrate) from which the final liquid or gel is produced A reduction in the loss of clarity or stability of a final heat-treated liquid arising from the reduction in the intensity of the heat treatment enabled by a pressure treatment Increase in clarity or stability of a heat treated protein-containing liquid or gel For the purposes of the described invention, "clarity" is measured as optical density (OD). OD refers to the absorption of light at 610 nm by the solution when placed in a cuvette with an optical path of approximately 1 cm in an LKB Ultraspec II spectrophotometer. A solution having a reading of zero OD passes 100% of the incident light, while a sample having an OD of 1.0 passes 10% of the incident light, and so forth. A solution with an OD of 1.0 is generally considered to be "opaque".

Furthermore, for the purposes of the described invention, the presence of sediment is an indicator of a loss of stability in a liquid or gel.

In acidic environments (typically at pH values below 3.5), some proteins are relatively stable in solution and clear solutions can be produced even after a heat treatment for microbial control and food safety. Furthermore, microbial pathogens cannot grow readily at such low pH values, therefore low pH protein-fortified foods and beverages have a good keeping quality. However such acidic solutions may have an undesirable flavour, and solutions with higher pH values may have improved flavour.

By applying a pressure treatment to a protein-containing liquid or gel, an acidic product having acceptable clarity at significantly higher pH values and higher protein concentrations can be achieved. The product has the desired microbial quality and keeping quality. As such, the pressure treatment can be used as an alternative to a heat treatment to produce a product having both acceptable clarity and microbial quality.

As noted above, the pressure treatment can be used in combination with a heat treatment to reduce or reverse the loss of clarity caused by heating. A combination of treatments may be selected to produce a more palatable product of acceptable microbial quality and acceptable clarity.

The applicants have also observed that the high pressure treatment of a protein-containing liquid or gel at near-neutral pH values (in particular a pH greater than about 6.0) can be used to enhance clarity properties of the liquid or gel when compared to a heat treatment.

The invention may be used on protein-containing beverages such as nutritional drinks or protein-fortified beverages such as fruit juices (e.g. apple juice) to which protein has been added. A pressure treatment on protein fortified juices would assist in improving the clarity of fruit juices after protein fortification, and maintaining or improving the clarity of juices with or without heating.

FIGS. 1a-1d demonstrate that it is possible to enhance clarity properties of a protein-containing liquid at significantly higher pH values using a pressure treatment instead of a heat treatment. The graphs show a comparison between the clarity of liquids that contain various sources of whey protein isolate (3% protein) at different pH levels, adjusted with phosphoric acid. Three protein-containing liquids were tested: an untreated control liquid, a heat treated liquid (80 degrees Celsius for 20 minutes) and a pressure treated liquid (600 MPa for 20 minutes). The pressure treated protein-containing liquid displays considerably higher clarity than the heat treated sample, especially at pH levels in the range 3.8 to 4.4, and higher than 6.0 (see FIG. 1b).

Figure 1A:
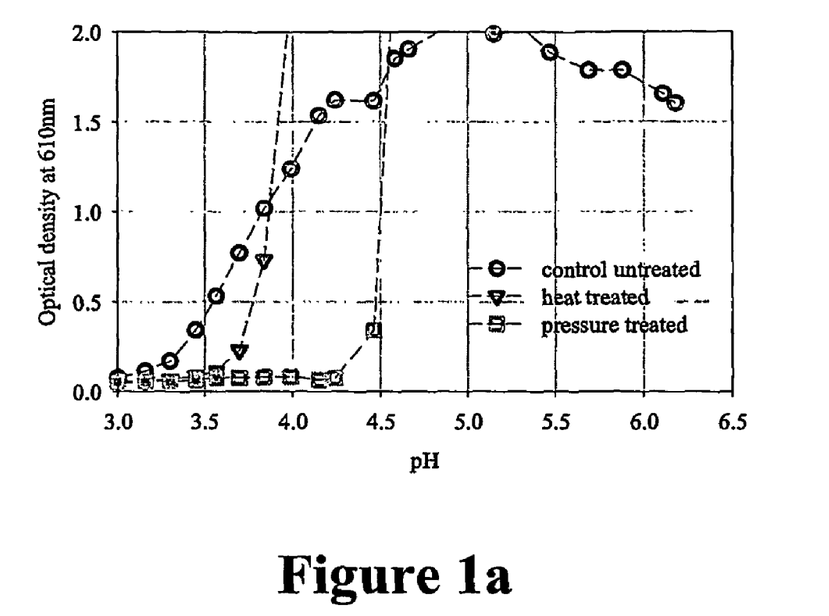
FIGS. 1a, 1b, 1c and 1d are graphs comparing the clarity of liquids that contain 3.5% whey protein isolate at various pH values. Untreated liquids are compared to heat-treated liquids and a pressure treated liquids.
Figure 1B:
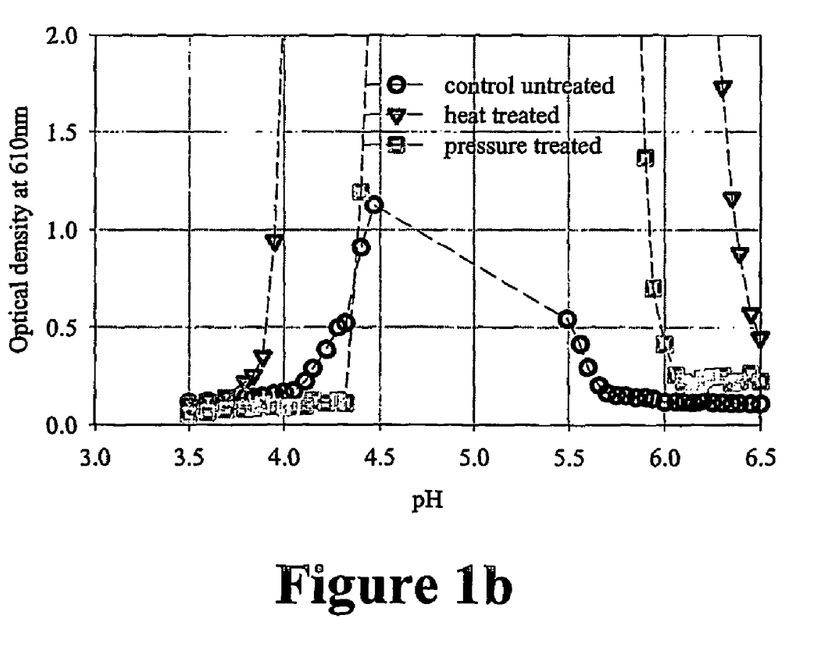
Figure 1C:
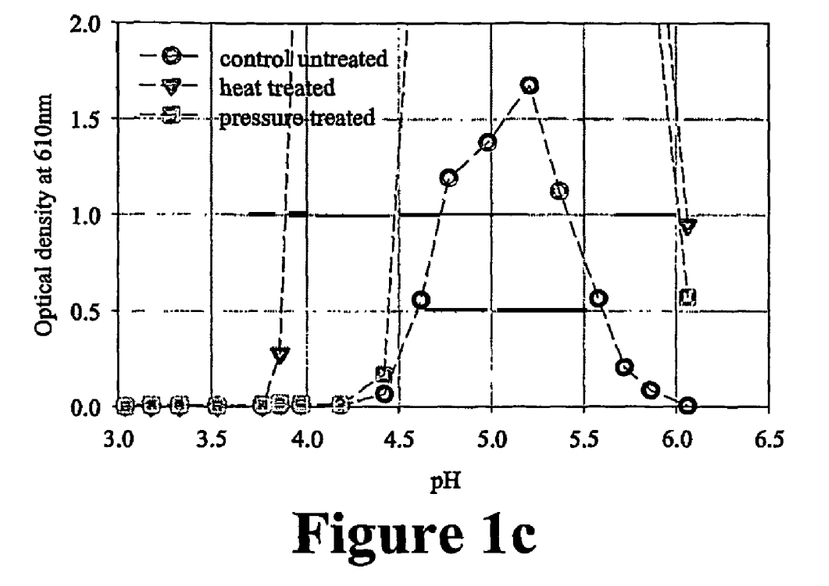
Figure 1D:
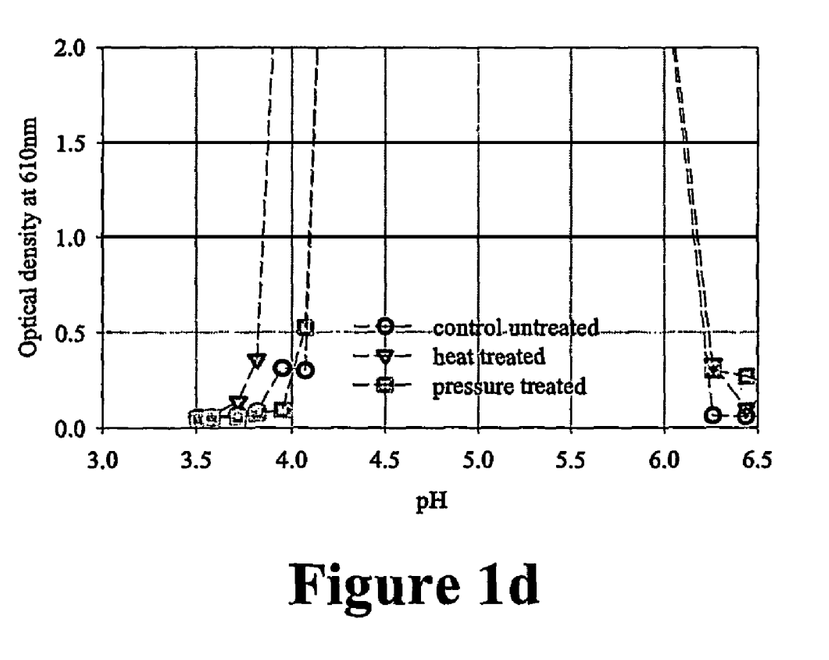
Figure 2:
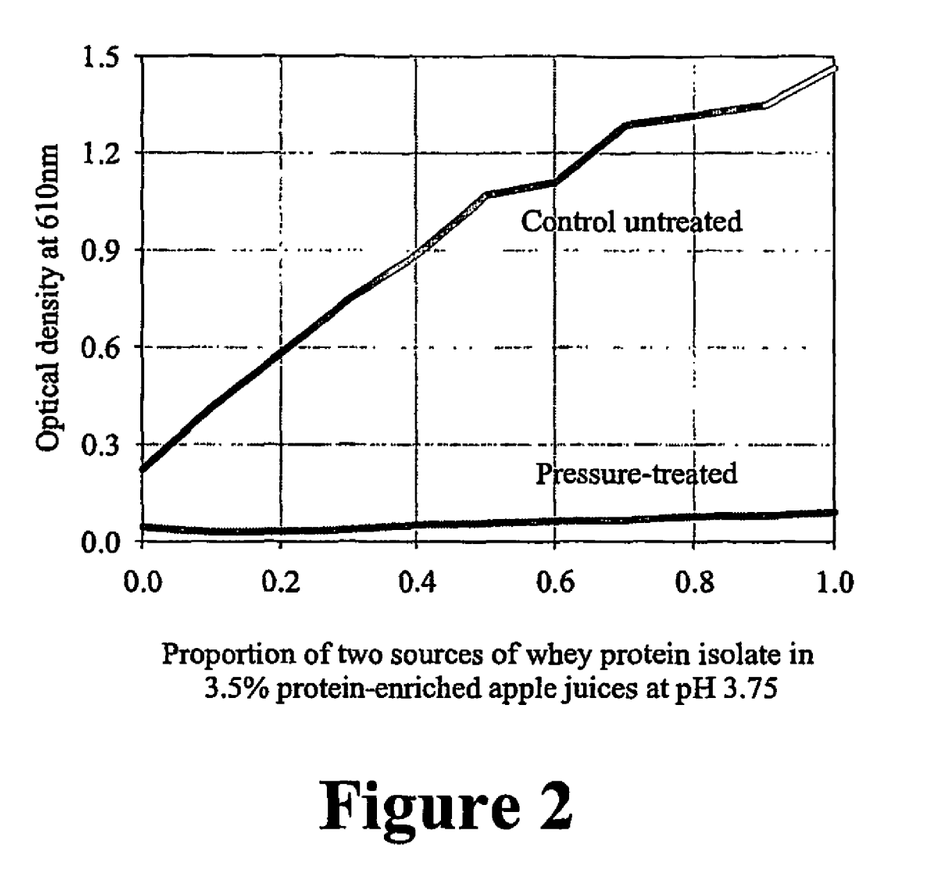
FIG. 2 is a graph comparing the clarity of protein-containing apple juices produced from blends of two sources of whey protein to a total protein content of 3.5% both with and without a pressure treatment of 600 MPa held for 3 min.

FIG. 2 demonstrates that the clarity of liquids containing different protein sources can be substantially standardised using a pressure treatment. Samples of a fruit juice were fortified with two different whey protein isolates in varying ratios. The different ratios of the two proteins resulted in varying levels of clarity for the untreated samples. However, after pressure treatment, the difference in clarity between each of the samples was substantially reduced.

Figure 3:
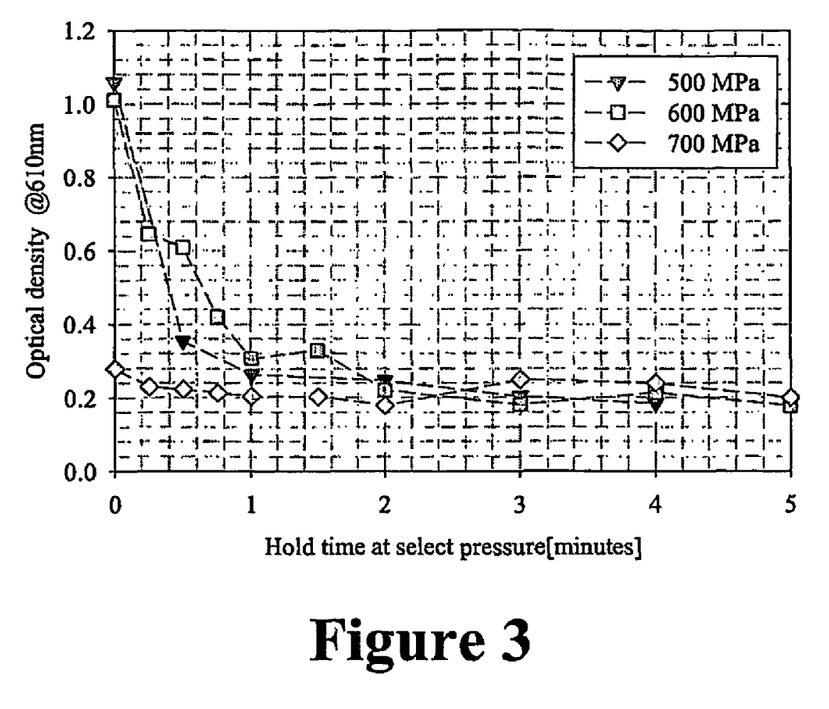
FIG. 3 is a graph showing how the desired clarity can be achieved in a protein-containing apple juice at 3.5% protein by using pressure treatments done at various set pressures held for various times.

FIG. 3 shows that varying pressure/time conditions can be tested to obtain desirable clarity in protein-containing liquids. Samples of an apple juice fortified with 3.5% whey protein isolate were pressure treated using different set pressures for different pressure holding times. Shorter holding times were possible for higher pressures in order to obtain desirable levels of clarity. For holding times of 2 minutes or more, the pressure treatments (500 MPa, 600 MPa and 700MPA) were equally effective in these particular conditions.

The invention has several commercially useful applications. In many instances, heat treatment or carbonation of a beverage may be necessary before sale to the consumer.

Traditionally, a heating step means that protein fortification may compromise quality due to the loss of clarity. A high pressure treatment can now be used to enhance clarity properties of a heat treated beverage and improve its marketability. Alternatively a sufficiently high pressure treatment will not only improve the clarity of a protein fortified beverage, but can also be used to inactivate unwanted microbes and improve keeping quality—and hence avoiding the need to heat treat the beverage at all. It will be understood by a person skilled in the art that pressures required to inactivate microbes are upwards from about 200 MPa. In particular, a pressure treatment of 580 MPa held for at least 3 minutes may be sufficient to produce a commercially sterile food at a pH below 4.0. Furthermore, with a heating step there is a minimum temperature required to effectively inactivate microbes, but a maximum temperature past which damage is done to protein fortified beverages. With pressure treatment, there is a minimum pressure requirement for the treatment to be effective.

Figure 4:
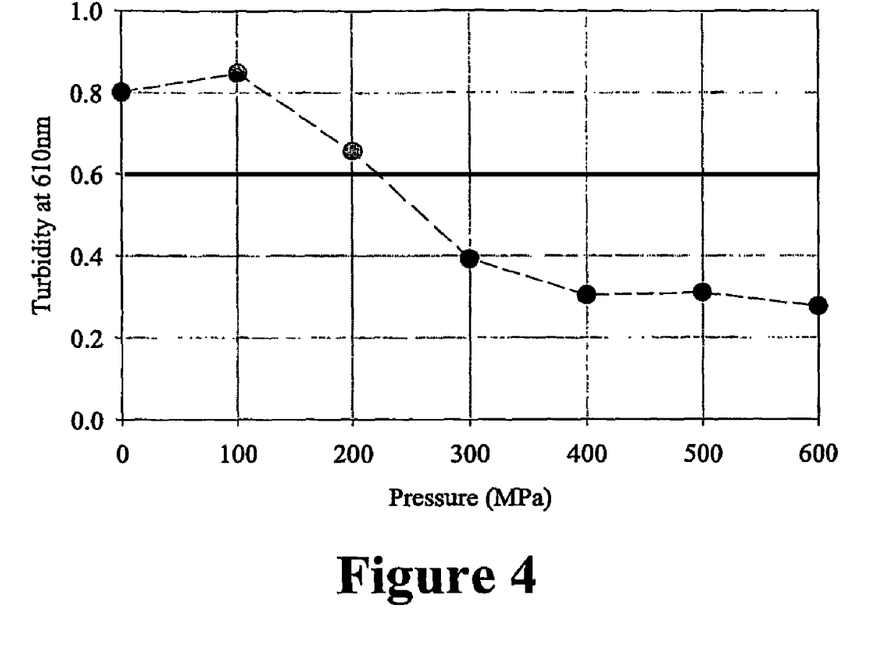
FIG. 4 is a graph showing how the desired clarity can be achieved in an 11% protein solution at pH 4.2 using pressure treatments consisting of various set pressures held for 1 minute
Figure 5:
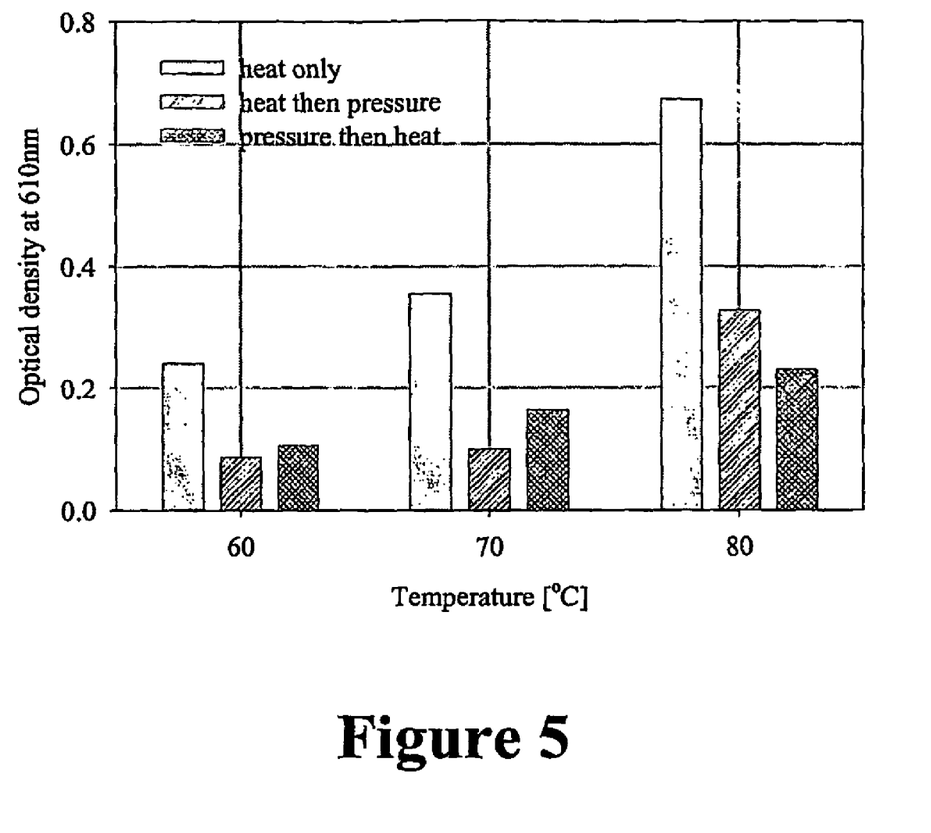
FIG. 5 is a graph showing how the clarity of a heat-treated protein-containing solution may be improved if the heat treatment (60° C., 70° C., 80° C. held for 20 minutes) is preceded or followed by a pressure treatment (in this case 600 MPa held for 20 minutes).

With the applicant's invention, a person skilled in the art would understand that to determine the pressure treatment required to obtain a protein-containing product of the desired clarity, representative samples of the product could be subjected to a range of pressures for a range of times. The minimum pressure-time treatment conditions resulting in a product of desired clarity could then be used to treat the remaining protein-containing product. The combination of the lowest pressure treatment and the shortest treatment time resulting in a product of acceptable clarity would typically constitute the lowest cost treatment option for obtaining a product of acceptable clarity (see FIG. 3 and FIG. 4).

Furthermore, it is recognised that a person skilled in the art would understand that pH adjustment may be required to optimize the effect of the pressure treatment.

It is understood that certain ingredients in a specific protein-containing product formulation may be added without affecting the working of the invention (e.g. colourings, preservatives, vitamins, flavourings, sugars, sweeteners, caffeine etc.). It is equally understood that the addition of certain ingredients will affect the working of the invention (e.g. fats, stabilizers).

In the case of an acid product any suitable physiologically-acceptable acid such as phosphoric or citric acid may be used to reduce the pH. Alternatively, any naturally acidic substrate such as a citrus juice may be used, or the pH may be reduced by fermentation.

EXAMPLES

In the following examples, solution clarity was measured by optical density (OD). OD refers to the absorption of light at 610 nm by the solution when placed in a cuvette with an optical path of approximately 1 cm in an LKB Ultraspec II spectrophotometer. A solution having zero OD passes 100% of the incident light, while a sample having an OD of 1 passes 10% of the incident light, and so forth. Furthermore, for the purposes of the described invention, the presence of sediment is an indicator of a loss of stability in a liquid or gel.

Example 1

A number of protein solutions were pressure treated in the following examples, and solution clarity was subsequently measured by OD. The tested solutions were standardised to 3.5% protein and had been acidified to various pH values in the range 3.5 to 6.5 using phosphoric acid.

Each solution was split and two alternative treatments applied, after which an OD was measured.

Control untreated

A heat treatment (80° C. held for 20 min)

A pressure treatment (600 MPa held for 20 min)

The ODs of the treated and control untreated solutions are shown in FIGS. 1a, 1b, 1c and 1d. In the pH range 3.5-4.5, the OD of the pressure-treated solutions were lower than the control untreated or heat-treated solutions, indicating improved clarity.

Example 2

A base sports beverage containing 8% whey protein isolate, 10% sucrose and 5% maltodextrin was adjusted to a pH of 4.0 using 50% citric acid. Samples of the beverage were each pressure-treated at 600 MPa for 3 min and stored for 6 months at 30° C., after which a number of microbial enumeration tests were performed (aerobic plate counts, yeasts and moulds and mesophilic spores). No colonies were detected by any of these tests. The pressure-treated beverage had an optical density of 0.022 compared to 0.438 for the untreated control beverage.

Example 3

The base sports beverage as described in Example 2 was pressure treated at 500 MPa for 5 min and stored for 6 months at 30° C., after which a number of microbial enumeration tests were performed (aerobic plate counts, yeasts and moulds and mesophilic spores). No colonies were detected by any of these tests. The pressure-treated beverage had an optical density of 0.045 compared to 0.438 for the untreated control beverage (as Example 2).

Example 4

A protein-syrup was produced by adding 5.0 kg of sucrose to 9.0 kg of a whey protein isolate retentate (22.3% protein), then adjusting the pH to 3.8 with 42.5% phosphoric acid. The syrup was pressure treated at 600 MPa held for 3 min and was used to produce beverages as exemplified below.

After twenty days storage at 30 degrees Celsius, mesospores were detected in the control sample but not in the pressure-treated sample. No colonies were detected when samples were tested for yeasts and moulds, coliforms or *staphylococcus*.

Example 5

A protein-syrup was produced by adding 2.0 kg of high fructose corn syrup 55 to 3.0 kg of a whey protein isolate retentate (22.3% protein), and adjusting the pH to 3.8 with 42.5% phosphoric acid. The syrup was pressure treated at 600 MPa held for 3 min, and used to produce the beverages as exemplified below. The optical density of the control untreated syrup was 1.291, while the optical density of the pressure-treated syrup was 0.635. After twenty days storage at 30 degrees Celsius, no colonies were detected when samples were tested for aerobic plate counts, yeasts and moulds, coliforms, *staphylococcus* or mesospores.

Example 6

The pressure-treated and control untreated syrups from Example 4 were used to produce 4% protein beverages as given in Table 1. The optical density of the beverages produced from pressure-treated and control untreated syrups were compared.

TABLE 1

| Ingredient | Mass (g) |
| --- | --- |
| Syrup (Example 4) | 2280 |
| Caffeine | 2.4 |
| Exotic fruits (Firmenich 502880C) | 8.0 |
| Red no. 40 (Sensient) | 0.032 |
| Tartrazine yellow (Sensient) | 0.08 |
| Total (with water) | 8000 | a) A beverage with a final pH of 3.8 formulated as in Table 1 from a pressure-treated syrup had an optical density of 0.023. In contrast, a beverage formulated as in Table 1 from an untreated syrup had an optical density of 0.118.
b) A beverage with a final pH of 3.8 was formulated as in Table 1, but with the addition of 61.8 g of calcium lactate. The beverage made from the pressure-treated syrup had an optical density of 0.025. In contrast, the beverage produced from the control untreated syrup had an optical density of 0.223.
c) A beverage was with a final pH of 4.0 was formulated as in Table 1, from a syrup of which the pH was adjusted to 4.0 with phosphoric acid. This beverage had an optical density of 0.044 when produced from pressure-treated syrup. In contrast, the beverage produced from the control untreated syrup had an optical density of 0.346.

Example 7

The syrup formulated in Example 5 was used to produce a number of 4% protein beverages, each with a final pH of 3.8 and each formulated as shown in Table 2. This beverage had an optical density of 0.029 when produced from pressure-treated syrup whereas the beverage produced from the untreated syrup had an optical density of 0.142.

TABLE 2

| Beverage formulation | |
| --- | --- |
| Ingredient | Mass (g) |
| Syrup (Example 5) | 2000 |
| Caffeine | 2.17 |
| Exotic fruits (Firmenich 502880C) | 7.22 |
| Red no. 40 (Sensient) | 0.032 |
| Tartrazine yellow (Sensient) | 0.08 |
| Total (with water) | 7200 |

Example 8

Beverages produced from pressure-treated and control untreated syrups were subjected to various heat treatments in the range 70-90 degrees Celsius held for 30 seconds. Then cooled to room temperature. The optical density of the heat treated beverages produced from either pressure-treated or control untreated syrups were measured and comparative results are set out in the below tables.

TABLE 3

| Heat treatment of beverage samples from Example 6a) | | |
| --- | --- | --- |
| Heat treatment | Optical density (control syrup) | At 610 nm (pressure syrup) |
| none | 0.118 | 0.023 |
| 70° C. - 30 sec | 0.661 | 0.043 |
| 75° C. - 30 sec | 0.829 | 0.048 |
| 80° C. - 30 sec | 0.968 | 0.054 |
| 85° C. - 30 sec | 1.079 | 0.051 |
| 90° C. - 30 sec | — | 0.041 |

TABLE 4

| Heat treatment of beverage samples from Example 6b) | | |
| --- | --- | --- |
| Heat treatment | Optical density (control syrup) | At 610 nm (pressure syrup) |
| none | 0.223 | 0.025 |
| 70° C. - 30 sec | 0.666 | 0.059 |
| 75° C. - 30 sec | 0.858 | 0.069 |
| 80° C. - 30 sec | 0.915 | 0.063 |
| 85° C. - 30 sec | 0.981 | 0.057 |
| 90° C. - 30 sec | 0.987 | 0.055 |

TABLE 5

Heat treatment of beverage samples from Example 6c)

| Heat treatment | Optical density (control syrup) | At 610 nm (pressure syrup) |
|---|---|---|
| none | 0.346 | 0.044 |
| 70° C. - 30 sec | 0.648 | 0.173 |
| 75° C. - 30 sec | 0.799 | 0.177 |
| 80° C. - 30 sec | 0.933 | 0.274 |
| 85° C. - 30 sec | 1.024 | 0.334 |
| 90° C. - 30 sec | 0.924 | 0.210 |

TABLE 6

Heat treatment of beverage samples from Example 7

| Heat treatment | Optical density (control syrup) | At 610 nm (pressure syrup) |
|---|---|---|
| none | 0.142 | 0.029 |
| 70° C. - 30 sec | 0.644 | 0.020 |
| 75° C. - 30 sec | 0.808 | 0.033 |
| 80° C. - 30 sec | 0.941 | 0.037 |
| 85° C. - 30 sec | 1.031 | 0.034 |
| 90° C. - 30 sec | 0.922 | 0.038 |

Example 9

A protein-syrup was produced by adjusting the pH of 276 g of a whey protein isolate retentate (22.55% protein) to pH 3.8 using 42.5% phosphoric acid, then adding 124 g sucrose. The resulting syrup was pressure treated at 600 MPa for 3 min. This syrup was diluted to 4% protein with water to form a beverage base. The optical density of the beverage base made from the pressure-treated syrup was 0.046, whereas the optical density of the control beverage was 0.488.

Both the pressure-treated and control beverages were then heated to 70° C. and held for 20 min, after which the optical density of the pressure treated beverage was 0.172 and the optical density of the control beverage was 0.885.

Example 10

A protein concentrate was produced by adjusting the pH of a whey protein isolate retentate (22.5% protein) to pH 3.8 using 42.5% phosphoric acid. The concentrate was then pressure treated at 600 MPa for 3 min. This concentrate was diluted to 4% protein using water to produce a beverage base.

The optical density of the pressure-treated beverage base was 0.037 whereas the untreated beverage base had an optical density of 0.094.

Samples of both the pressure treated and control beverages were then heated to 70° C. and held at that temperature for 20 minutes, after which the optical densities were 0.099 and 0.260 respectively. Samples of both the pressure treated and control beverages were heated to 80° C. and held for 20 minutes, after which the optical densities were 0.160 and 0.262 respectively.

Example 11

A protein-syrup was produced by adjusting the pH of 61 g of whey protein isolate retentate (22.5% protein) to pH 3.8 using 42.5% phosphoric acid, then 37 g of high fructose corn syrup 55 was added. The resulting syrup was pressure-treated at 600 MPa for 3 minutes. This syrup was diluted to 4% protein using water to produce a beverage base.

The optical density of the pressure-treated base was 0.042 whereas the optical density of the untreated base was 0.082.

Both the pressure-treated and control beverages were then heated to 70° C. and held for 20 minutes, after which the optical densities were 0.171 and 0.374 respectively.

Example 12

A carbonated protein beverage containing 4% protein was produced by mixing together the ingredients as given in Table 7, then combining with carbonated water at 4° C. The optical densities of carbonated beverages produced from pressure-treated syrup and control untreated syrup were measured and compared. The beverage formed from the pressure treated syrup had an optical density of 0.057, whereas the beverage made with the untreated syrup had an optical density of 0.275.

TABLE 7

Carbonated beverage formulation

| Ingredient | Mass (g) |
|---|---|
| Syrup (Example 4) | 285 |
| Caffeine | 0.3 |
| Exotic fruit (502880C) | 1.0 |
| Red no. 40 | 0.004 |
| Yellow tartrazine | 0.01 |
| Total (with carbonated water) | 1000 |

The carbonated beverage produced from the untreated (control) syrup was bottled and pressure-treated in the bottle at 600 MPa for 3 minutes. The optical density of the resulting pressure-treated beverage was 0.018, whereas the optical density of the beverage before the pressure treatment was 0.275.

Example 13

Protein-calcium beverage bases containing whey protein isolate (3.5% protein) and 250 mg per 240 mL of calcium from a variety of calcium sources were pH-adjusted to 3.8-4.0 using citric acid. The pH and optical densities of the beverage bases before and after a pressure treatment of 600 MPa for 3 minutes are shown in Table 8.

TABLE 8

Calcium fortified protein beverage bases

| Calcium source | Final pH | Optical density Before pressure | at 610 nm After pressure |
|---|---|---|---|
| Calcium lactate | 3.82 | 0.029 | 0.009 |
| Tricalcium phosphate | 3.98 | 0.587 | 0.014 |
| Tricalcium phosphate/ calcium lactate 75/25 blend | 4.00 | 0.472 | 0.010 |
| Calcium citrate malate | 3.85 | 0.218 | 0.044 |
| Calcium citrate | 4.03 | 0.948 | 0.024 |

Example 14

A fruit juice base was made by adding 1000 g of water to 150 g of an apple juice concentrate (42 Brix). Varying amounts of two different sources of whey protein isolate were added to samples of the base to produce a range of protein-containing juices with a total protein content of 3.5%, and a final pH of 3.7 to 3.8 (after adjustment with 42.5% phosphoric acid).

These blended-protein juices were then pressure treated at 600 MPa for 3 minutes, and the optical densities at 610 nm were compared to untreated control juices. The results are shown in the FIG. 2.

The optical density of the control untreated juice increased from 0.223 to 1.469 as the proportion of each whey protein isolate changes from 0% to 100% of the total protein added. However, the optical density of the pressure treated juice is substantially lower, increasing from 0.044 to 0.091 over the same range.

Example 15

A protein-calcium juice base was produced by adding 2.74 g of calcium citrate-malate to 250 g of an apple juice concentrate (42 Brix), then adding 710 g of water. 9.3 g of a whey protein isolate was added to 240 mL portions of this base enriched juice to produce a 3.5% protein beverage containing 250 mg of calcium. Citric acid was added to portions of this beverage to produce beverages of pH 4.00, 3.90, 3.80, 3.70, and 3.60. The optical density of these beverages was measured before and after a pressure treatment of 600 MPa for 3 minutes (table 9).

TABLE 9

Calcium fortified protein beverage bases

| pH | Optical density Before pressure | at 610 nm After pressure |
|---|---|---|
| 4.0 | 2.138 | 0.489 |
| 3.9 | 2.029 | 0.183 |
| 3.8 | 1.978 | 0.165 |
| 3.7 | 1.934 | 0.165 |
| 3.6 | 1.883 | 0.132 |

A precipitate formed when these beverages were heat treated (80 degrees Celsius held for 20 minutes).

Example 16

A protein-calcium juice base was produced as for Example 15, except that phosphoric acid was added to portions of this beverage base to produce beverages of pH 3.96, 3.90, 3.77, 3.68, and 3.60.

The optical density of these beverages was measured before and after a pressure treatment of 600 MPa for 3 minutes (table 10).

TABLE 10

Calcium fortified protein beverage bases

| pH | Optical density Before pressure | At 610 nm After pressure |
|---|---|---|
| 3.96 | 2.035 | 0.169 |
| 3.90 | 1.944 | 0.177 |
| 3.77 | 1.892 | 0.143 |
| 3.68 | 1.821 | 0.124 |
| 3.60 | 1.719 | 0.124 |

A precipitate formed when these beverages were heat treated (80 degrees Celsius held for 20 min).

Example 17

A protein-calcium juice base was produced by adding 2.74 g of calcium citrate-malate to 250 g of an apple juice concentrate (42 Brix), then adding 710 g of water. 8.9 g of whey protein isolate was added to 240 mL portions of this base enriched juice to produce a 3.5% protein beverage containing 250 mg of calcium.

Phosphoric acid was added to samples of this beverage to produce beverages of pH 4.05, 3.9, 3.8, 3.7, and 3.6. The optical density of these beverages was measured before and after a pressure treatment of 600 MPa for 3 minutes (table 11).

TABLE 11

Calcium fortified protein beverage bases

| | Optical density Before pressure | At 610 nm After pressure |
|---|---|---|
| 4.05 | 0.934 | 0.916 |
| 3.90 | 0.861 | 0.175 |
| 3.80 | 0.777 | 0.190 |
| 3.70 | 0.695 | 0.110 |
| 3.60 | 0.683 | 0.090 |

The optical density was 0.290 when the beverage at pH 3.6 was subjected to a heat-treatment of 80° C. held for 20 min instead of the pressure treatment. However sediment formed when the beverages in the range of pH 3.9-4.0 were subjected to a heat-treatment (80 degrees Celsius held for 20 minutes).

Example 18

A protein-calcium juice base was produced as for Example 17, except that citric acid was added to portions of this beverage base to produce beverages of pH 4.04, 3.90, 3.81, 3.70, and 3.60.

The optical density of these beverages was measured before and after a pressure treatment of 600 MPa for 3 minutes (table 12).

TABLE 12

Calcium fortified protein beverage bases

| pH | Optical density Before pressure | At 610 nm After pressure |
|---|---|---|
| 4.04 | 1.036 | 0.691 |
| 3.90 | 0.976 | 0.233 |
| 3.81 | 0.911 | 0.258 |
| 3.70 | 0.865 | 0.173 |
| 3.60 | 0.828 | 0.118 |

The optical density ranged from 0.290 to 1.326 with precipitates forming when the beverages in the pH range 3.6-3.9 were subjected to a heat-treatment of 80° C. held for 20 min instead of the pressure treatment. A heavy sediment formed when the beverage pH 4.0 was subjected to the same heat-treatment.

Example 19

The selection of the high pressure processing hold time and set pressure required to achieve the desired clarity in a specific beverage is shown in FIG. 3.

A protein-enriched apple juice (3.5% protein) was produced by adding 17.25 g of whey protein isolate and 20.94 g of sucrose to 55.70 g of apple juice concentrate (42 Brix) and then diluting with 445.5 g of water. The pH was adjusted to 4.0 with phosphoric acid. The beverage was then pressure-treated at a range of set pressure-hold time combinations (see FIG. 3). The shortest hold times at which the highest clarity (as lowest optical density) was achieved at a given set pressure are approximately 2 mins at 500 MPa and 600 MPa compared to 15 sec at 700 MPa. In contrast the optical density of the untreated control protein-enriched apple juice was 1.961.

Example 20

A whey protein/protein hydrolysate recovery beverage base was produced by making up 8.9 g of whey protein isolate and 2.2 g protein hydrolysate, 20 g of sucrose and 5 g of maltodextrin M180 and adjusting to pH 3.8 with phosphoric acid to 200 g in water. The resulting beverage base had 4% protein, and 1% protein hydrolysate composition. The base had an optical density of 1.618, but after a pressure treatment of 600 MPa held for 3 min, the optical density was reduced to 0.136.

Example 21

An iron-fortified protein beverage base was produced by dissolving 34.6 mg of ferrous sulphate heptahydrate and 3.71 g of whey protein isolate in 90 g of water, then adjusting, the pH to 3.8 with 40% citric acid and adding water to bring the beverage base to 100 g. This beverage had an optical density of 2.310, but on subjecting to a heat treatment of 80 degrees Celsius for 20 min, an extensive sediment was formed. In contrast, the beverage had an optical density of 0.250 when subjected to a pressure treatment of 600 MPa held for 3 minutes.

Example 22

1.036 g of calcium lactate was added to 50.0 g of the syrup produced as in Example 5, and the pH was readjusted to 3.8 with phosphoric acid. This amount of calcium is sufficient to supply 200 mg of calcium per 240 mL serving of the beverage formulated as described in table 2. The optical density of this syrup was 1.895, but was reduced to 1.079 by a pressure treatment of 600 MPa held for 3 minutes.

REFERENCES

1. Huffman, L. M. (1996) Food Technology 50(2), 49-52,
2. International Dairy Federation (1998) Whey. Proceedings of the Second International Whey Conference, Chicago, Ill.
3. Comprehensive Reviews in Food Science and Food Safety (2003) 2 (Suppl).

What we claim is:

1. A method of enhancing clarity and/or stability properties of a protein-containing liquid or gel, comprising subjecting said liquid or gel to a hydrostatic pressure treatment of at least 400 MPa, wherein the protein consists essentially of whey protein, whey protein isolate, whey protein concentrate, or low fat whey protein concentrate, and wherein the pH of the liquid or gel is less than about 4.5 and wherein the clarity and/or stability properties of said liquid or gel are enhanced.

2. A method according to claim 1 wherein the clarity properties of the protein-containing liquid or gel are enhanced.

3. A method according to claim 1 wherein the stability properties of the protein-containing liquid or gel are enhanced.

4. A method according to claim 1 wherein some or all of the protein is hydrolysed.

5. A method according to claim 1 wherein the protein is a combination of hydrolysed protein and non-hydrolysed protein.

6. A method according to claim 1 wherein the pH of the liquid or gel is between 3.5 and 4.2.

7. A method according to claim 1 wherein the protein is present in the liquid or gel at a concentration of less than about 40% w/w.

8. A method according to claim 1 wherein the liquid or gel is pressure treated at a pressure of at least about.

9. A method according to claim 1 wherein the protein-containing liquid or gel further comprises an amount of a monovalent, divalent or polyvalent metal cation or a combination thereof.

10. A method according to claim 9 wherein the divalent or polyvalent metal cation is selected from: calcium, iron, or a combination thereof.

11. A method according to claim 1 wherein the protein-containing liquid or gel further comprises one or more of the following: calcium lactate, tricalcium phosphate, calcium citrate-malate, calcium lactate gluconate, and calcium citrate.

12. A method according to claim 1 wherein the protein-containing liquid or gel further comprises one or more of the following: ferrous sulphate heptahydrate, and iron pyrophosphate.

13. A method according to claim 1 wherein the protein-containing liquid or gel further comprises at least one of the following: carbohydrate, sugar alcohol, alcohol, sweetening agent, or a combination thereof.

14. A method according to claim 1 wherein the protein-containing liquid or gel further comprises one or more of the following: sucrose, fructose, maltodextrin, glucose, lactose, galactose, or a combination thereof.

15. A method according to claim 14 wherein the fructose is high fructose corn syrup.

16. A method according to claim 1 wherein the protein-containing liquid or gel further comprises fermentable liquor.

17. A method according to claim 1 wherein the protein-containing liquid or gel is carbonated.

18. A method according to claim 1 wherein the pressure treatment takes place after a heat treatment, or before a heat treatment.

19. A method according to claim 18 wherein the heat treatment comprises heating the protein-containing liquid or gel at more than about 70 degrees Celsius for at least 30 seconds.

20. A method according to claim 1 wherein the protein is present in the liquid or gel at a concentration of less than about 28% w/w.

21. A method according to claim 1 wherein the protein is present in the liquid or gel at a concentration of less than about 10% w/w.

22. A method according to claim 1 wherein the liquid or gel is pressure treated at a pressure of at least about 580 MPa.

23. A method according to claim 1 wherein the liquid or gel is pressure treated at a pressure of at least about 700 MPa.

24. A method according to claim 1 wherein the liquid or gel is pressure treated at a pressure of at least about 800 MPa.

* * * * *